Sept. 25, 1934.  J. GASPARI  1,974,455
EYEGLASS FRAME OF THE FOLDING OR COLLAPSIBLE TYPE Filed March 16, 1934

Joseph Gaspari
INVENTOR

BY Francis E. Boyce
ATTORNEY

Patented Sept. 25, 1934

1,974,455

UNITED STATES PATENT OFFICE 1,974,455

EYEGLASS FRAME OF THE FOLDING OR COLLAPSIBLE TYPE

Joseph Gaspari, New York, N. Y., assignor to J. Gaspari & Co., Inc., New York, N. Y., a corporation of New York Application March 16, 1934, Serial No. 715,848

2 Claims. (Cl. 88—44)

This invention relates to eyeglass frames of the folding or collapsible type, the principal object of the invention being to provide an improved device for positively retaining the frame in folded condition, and which device is releasable in response to a very slight pressure between the thumb and index finger of the operator thereby to permit return of the glass frame to normal operative position.

Other objects and advantages of the invention will appear as the description proceeds.

In the drawing accompanying this specification,

Figure 1:
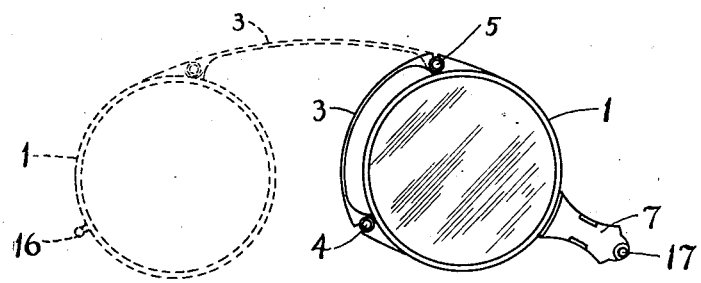
Fig. 1 is a face view of a collapsible eyeglass frame embodying the present invention, the full and broken lines respectively showing the frame in folded and unfolded condition.
Figure 2:
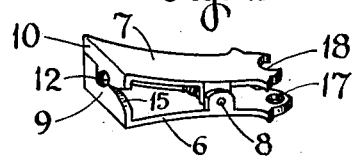
Fig. 2 is an enlarged perspective view of the locking clip detached from the frame.

Referring to the drawing, the collapsible eyeglass frame comprises, as usual, a pair of lens-holding rims 1 and 2 connected together by a spring bridge piece 3, the opposite ends of which are hingedly connected to lugs formed on the peripheries of the respective rims, as indicated at 4 and 5, all in well-known manner, whereby the rims may be brought into overlying relation as shown in full lines in Fig. 1, and locked in that position, and, when the locking device is released, will automatically assume the operative position indicated in dotted lines in Fig. 1.

Figure 4:
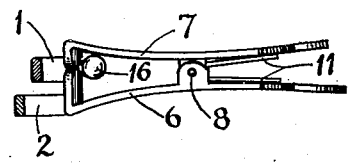
Fig. 4 is a side view of the locking clip illustrating the manner in which it engages and locks the lens frame in folded position, the lens rims being shown in section.
Figure 5:
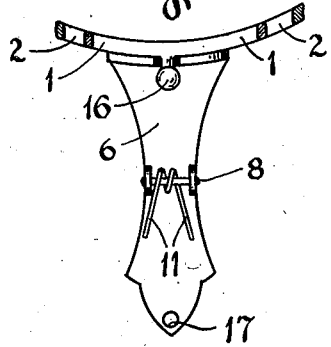
Fig. 5 is a sectional plan view of the device shown in Fig. 4, but with the upper clamping member of the clip removed for clearness of illustration.

The present invention has to do especially with the locking device or clip. As shown herein, the clip comprises a pair of clamping members 6 and 7 hinged together about midway of their length, as indicated at 8. At one end, each of the clamping members is provided with jaw-forming flanges 9 and 10 respectively, said flanges being located so as to be in direct alinement with each other whereby they will mutually contact edge to edge. For maintaining the jaws normally in engagement, a hinge spring 11 is mounted on the pintle connection between the clamp members and having its opposite elongated ends bearing against the respective clamp members as shown clearly in Figs. 4 and 5. It will be obvious that any form of spring which will maintain the clamp members apart at one side of their hinge connection will serve the purpose.

Figure 3:
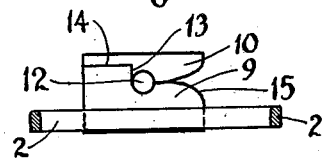
Fig. 3 is an end view of the clip showing the same attached to one of the lens rims, the latter being shown in section.

The clamping jaws 9, 10 are of peculiar formation along their meeting edges, as best shown in Fig. 3, wherein it will be seen that the two jaws are cut away to form between them a circular aperture 12, at one side of which the edges of the jaws are shouldered, as shown at 13, the shouldered portion being adjacent to the aperture 12 and extending to a height somewhat above said aperture. From the upper end of the shoulder the edges of the clamp members meet on a horizontal line as shown at 14. At the opposite side of the aperture the edges of the clamp members curve away from each other as shown at 15.

The jaw 9 of the lower clamp member is of concave formation at its outer surface so as to fit snugly against the periphery of one of the lens rims, preferably that one which is at the right when the glasses are in use, said rim being designated 2 in the drawing. The clamp member may be secured to the lens rim by any suitable means. The other lens rim 1 is provided at the proper point on its periphery with a radially extending lug or stem preferably merging at its outer end in a rounded head or knob 16, said stem being adapted to lie in the aperture 12 formed by the clamping jaws of the clip thereby to lock the rims together in folded position.

It is believed that the operation of the device will be clear from the foregoing description. When it is desired to lock the lens frames together as shown in full lines in Fig. 1, they are pressed toward each other in the well known manner until the peripheral stem of the rim 1 enters between the edges of the clamping jaws 9 and 10, whereupon, by reason of the curvature of those edges the stem will act to separate the clamping jaws against the tension of spring 11 until the stem drops into the aperture 12 and abuts against the shoulder or stop 13 of the lower jaw. The lens-carrying rims will then be in the folded or overlapping position as shown in full lines in Fig. 1, in which position they will be held by reason of the fact that the knobbed stem 16 cannot leave the aperture 12 until the jaws are separated. Such separation is accomplished by slightly squeezing the outer ends of the clamp members toward each other, whereupon the stem will, under the tension of the spring bridge 3, pass backward out of the aperture and thus release the lens rim 1 so that it will return to the normal operative position shown in broken lines in Fig. 1.

The clamping member 6 may be utilized as a means for connecting the eyeglass to a chain, and for this purpose the member is provided at the end thereof farthest from the lens rims with a perforation 17 through which the usual connecting link of the chain may be hooked. In order that the said chain may not interfere with the operation of the clip when the clamping members are pressed together, the upper clamping member 7 may be slotted or cut away at its end, as indicated at 18, so that when the clamping members are pressed toward each other at that end, that portion of the chain connection lying above the member 6 will pass through the slotted opening in member 7 and thus permit free movement of the clamping members toward each other.

While I have described in detail the device illustrated herein, it is to be understood that the invention is not thereby limited to the precise features of construction illustrated, as I am aware that many mechanical modifications may be made therein without departing from the spirit and scope of the invention as set forth in the claims appended hereto.

Having thus described my invention, what I claim is:

1. A locking clip for foldable eyeglass frames, comprising a pair of clamping members hingedly connected together and each having at one end a flange extending toward and in the same plane with the flange of the companion member, a spring normally maintaining the flanges in mutual contact at their meeting edges, said meeting edges cooperating to form a centrally disposed perforation, a laterally extending guideway at one side of said perforation and a shoulder at the opposite side thereof.

2. In a foldable eyeglass frame, the combination of a pair of lens rims flexibly connected together and adapted to be moved into overlapping position, one of said rims having a peripheral lug, a clip for retaining the rims in said position and comprising a pair of clamping jaws hingedly connected together and having flexible means for retaining them in mutual contact, one of said jaws being secured to one of the lens rims and the contacting portions of the jaws cooperating to form an opening for the reception of said lug and a laterally extending guideway at one side of said opening whereby manipulation of the rims into overlapping position the lug will separate the jaws against the tension of said flexible means and will be locked thereby in said opening, said jaws being separable by a slight pressure thereby to release said lug and permit return of the lens rims to operative position under the action of their flexible connection.

JOSEPH GASPARI.